United States Patent
Sovio et al.

(10) Patent No.: US 7,194,438 B2
(45) Date of Patent: Mar. 20, 2007

(54) ELECTRONIC PAYMENT SCHEMES IN A MOBILE ENVIRONMENT FOR SHORT-RANGE TRANSACTIONS

(75) Inventors: Sampo Sovio, Vantaa (FI); Jan-Erik Ekberg, Helsinki (FI); Nadarajah Asokan, Espoo (FI); Pekka Lahtinen, Helsinki (FI)

(73) Assignee: Nokia Corporation, Espoo (FI)

( * ) Notice: Subject to any disclaimer, the term of this patent is extended or adjusted under 35 U.S.C. 154(b) by 115 days.

(21) Appl. No.: 10/785,025

(22) Filed: Feb. 25, 2004

(65) Prior Publication Data

US 2005/0187882 A1     Aug. 25, 2005

(51) Int. Cl.
  *G06Q 99/00*   (2006.01)
  *H04K 1/00*    (2006.01)
  *H04L 9/00*    (2006.01)

(52) U.S. Cl. .......................................... 705/50; 705/51
(58) Field of Classification Search .................. 705/14, 705/17, 26, 65, 51, 75; 455/406, 558; 340/568.7, 340/539.1
  See application file for complete search history.

(56) References Cited

U.S. PATENT DOCUMENTS

| | | | |
|---|---|---|---|
| 5,629,981 A | 5/1997 | Nerlikar | 380/25 |
| 5,943,624 A * | 8/1999 | Fox et al. | 455/556.1 |
| 5,959,530 A | 9/1999 | Lupien, Jr. et al. | 340/568.1 |
| 6,078,806 A * | 6/2000 | Heinonen et al. | 455/406 |
| 6,105,008 A * | 8/2000 | Davis et al. | 705/41 |
| 6,418,326 B1 * | 7/2002 | Heinonen et al. | 455/558 |
| 6,434,403 B1 * | 8/2002 | Ausems et al. | 455/556.2 |
| 6,587,835 B1 * | 7/2003 | Treyz et al. | 705/14 |
| 6,647,497 B1 | 11/2003 | Cromer et al. | 713/200 |
| 6,705,520 B1 * | 3/2004 | Pitroda et al. | 235/382.5 |
| 6,764,003 B1 * | 7/2004 | Marschitsch et al. | 235/383 |
| 6,769,607 B1 * | 8/2004 | Pitroda et al. | 235/380 |
| 6,771,981 B1 * | 8/2004 | Zalewski et al. | 455/557 |
| 6,892,052 B2 | 5/2005 | Kotola et al. | 455/41.2 |
| 7,093,767 B2 * | 8/2006 | Faenza et al. | 235/493 |
| 2001/0005832 A1 * | 6/2001 | Cofta | 705/17 |

(Continued)

FOREIGN PATENT DOCUMENTS

EP     1199684 A2    4/2002

(Continued)

OTHER PUBLICATIONS

Dana Flavelle, "Pay tag puts 'express' in express lines payment system . . . ", Toronto Star, Sep. 24, 2003.*

(Continued)

*Primary Examiner*—Andrew J. Fischer
*Assistant Examiner*—Evens Augustin
(74) *Attorney, Agent, or Firm*—Morgan & Finnegan, LLP

(57) ABSTRACT

A short-range transaction system enables a user to conduct transactions with a self-service terminal in a user-friendly environment without using currency. The user carries a portable smart card, which interacts with a mobile phone. After authentication via an RFID connection, the device MAC address and a security key (K) are imprinted in the card. In operation, the user waves the smart card past the self-service terminal and activates an RFID connection. The terminal sends the card a random number. The card returns the MAC address and a result (RES) computed using the hash value and the security key. The terminal using the MAC address and security key establishes a secure connection with the device. The terminal downloads the user's transaction interface from the device and displays the user interface at the self-service terminal. The user completes a transaction at the terminal via the user interface.

43 Claims, 12 Drawing Sheets

U.S. PATENT DOCUMENTS

| | | | |
|---|---|---|---|
| 2002/0062284 A1 | 5/2002 | Kawan | 705/43 |
| 2002/0084896 A1 | 7/2002 | Dixit et al. | 340/447 |
| 2002/0131445 A1* | 9/2002 | Skubic et al. | 370/465 |
| 2002/0143655 A1* | 10/2002 | Elston et al. | 705/26 |
| 2003/0030542 A1 | 2/2003 | VonHoffmann | 340/5.61 |
| 2003/0055738 A1* | 3/2003 | Alie | 705/26 |
| 2003/0065805 A1* | 4/2003 | Barnes, Jr. | 709/231 |
| 2003/0105954 A1 | 6/2003 | Immonen et al. | 713/156 |
| 2003/0167207 A1 | 9/2003 | Berardi et al. | 705/16 |
| 2003/0191721 A1* | 10/2003 | Fiammante | 705/65 |
| 2004/0243519 A1* | 12/2004 | Perttila et al. | 705/75 |
| 2004/0250066 A1* | 12/2004 | Di Luoffo et al. | 713/168 |
| 2005/0068190 A1* | 3/2005 | Krause | 340/825.22 |
| 2005/0136949 A1* | 6/2005 | Barnes, Jr. | 455/461 |

FOREIGN PATENT DOCUMENTS

| | | |
|---|---|---|
| EP | 1 239 630 A2 | 9/2002 |
| EP | 1 271 887 A1 | 1/2003 |
| WO | 99/41876 | 8/1999 |
| WO | 01/45319 A1 | 6/2001 |
| WO | WO/02/073874 A2 | 9/2002 |
| WO | 02/084896 A1 | 10/2002 |
| WO | WO 02/100065 A1 | 12/2002 |
| WO | WO/2004/012352 A1 | 2/2004 |
| WO | WO/2005/002703 A1 | 1/2005 |

OTHER PUBLICATIONS digitatransactions.com, "Early Results Look Good For AmEx's RF payment Pilot", Nov. 4, 2003.* digitatransactions.com, "MasterCard Teams with Motorola to Test PayPass For Cell phones", Oct. 12, 2004.*

Jaclyn Easton, "Going Wireless: Transform Your business with mobile technology", Happer Collins, 2002.*

AMonline.com, Cellphones: a key player in proximity systems, May 5, 2006.*

* cited by examiner

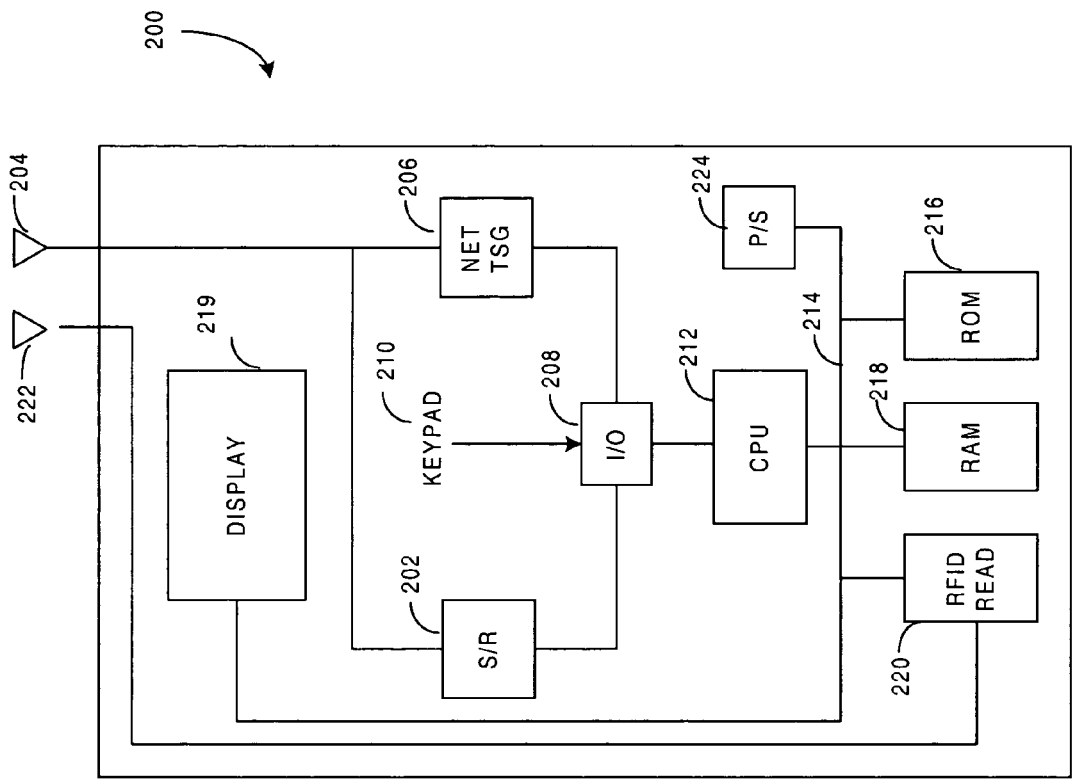
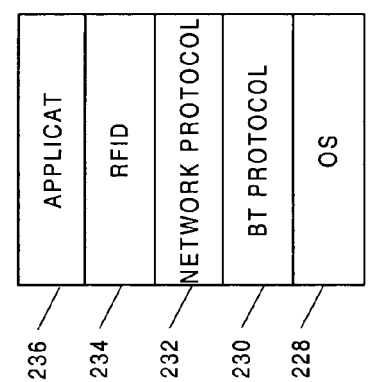
Fig. 2
Fig. 2A

ELECTRONIC PAYMENT SCHEMES IN A MOBILE ENVIRONMENT FOR SHORT-RANGE TRANSACTIONS

BACKGROUND OF INVENTION

1. Field of Invention

This invention relates to wireless communication systems, methods, apparatus and program products. More particularly, the invention relates to electronic payment schemes in a mobile environment for secure short-range transactions.

2. Description of Prior Art

An industry study group comprising banks, credit card issuers and mobile device manufacturers is considering the mobile device as an alternative to a bank or credit card for e-commerce transactions. Several options have been considered for secure wireless transactions, including, (1) incorporating a bank card in a mobile device; (2) using the device subscriber identity module (SIM); (3) storing payment software in the device for processing payment transactions; and (4) using an embedded tag in the device. However, it is difficult to design easy-to-use interfaces for such options in traditional short-range transaction systems. Even if a user knows how to use a traditional short-range e-commerce mechanism, it is likely the user would prefer to use money or cards for transactions, particularly, when the mechanisms for short range e-commerce are strange and not user-friendly in ordinary customer transactions. To extend the range of e-commerce services available from mobile devices, it would be desirable to enable a mobile device to serve as an alternative to a bankcard, particularly, when the mobile device is easier to use than money or bankcards for transactions and do not involve currency. It would be further desirable to provide a user transaction interface at merchant terminal enabling a user to conduct e-commerce via the terminal using the user transaction interface. It would be still further desirable to establish a secure connection between the mobile device and the terminal in conducting e-commerce. It would be still further desirable to establish a secure connection between the mobile device and the terminal using short-range communication (Bluetooth) without using a service discovery protocol.

Prior art related to mobile devices involved in e-commerce, includes:

1) WO 9941876 entitled "SYSTEM, METHOD AND APPARATUS FOR SECURE TRANSMISSION OF CONFIDENTIAL INFORMATION", published Aug. 19, 1999 discloses establishing a secure wireless radio communications link (IR) between two devices that minimizes the exposure of sensitive information to third party interception is disclosed. The secure link is established by first establishing an infrared link (IR) between the two devices for the exchange of sensitive information, such as encryption information. Subsequent communications (RF) would then have the benefit of encryption protection, establishing the secure wireless radio communications link.

2) WO 0145319 entitled "A METHOD AND SYSTEM FOR ESTABLISHING A SHORT-RANGE RADIO LINK", published Jun. 21, 2001 discloses establishing a first short-range radio link, operating within a first link range (13), between a stationary unit (12) and a mobile communication device (10, A) in a wireless network environment, wherein the stationary unit (12) transmits an interrogation signal to said mobile communication device (10, A) via a short-range communication link operating within a second link range (14) essentially smaller than said first link range (13). The mobile communication device (10, A) receives the interrogation signal from the stationary unit (12), and generates and transmitting a respond signal, including a unique identification number of the mobile communication device (10, A), to said interrogation signal. The stationary unit (12) receives said respond signal, and authenticate the identification number. Finally, the stationary unit (12) and said mobile communication device (10, A) establish a connection via said first short-range radio link.

3) EP 1271887 entitled "A SYSTEM AND METHOD FOR TRANSMITTING DATA VIA A WIRELESS CONNECTION IN A SECURE MANNER" published Jan. 2, 2003 discloses enabling a user of a remote controller to transmit a PIN over a wireless connection in a secure manner. A terminal device, used for conducting transactions with a service provider, is coupled to the service provider via a data network and a display such as that of a television or personal computer. The same remote control device (either IR or RF) that is used to operate the display is also used to transmit an encoded PIN to the terminal. Session-specific coding rules for encoding the PIN are displayed to the user to guide him through the encoding process. Upon receipt of the encoded PIN, the terminal decodes it, validates it and, if appropriate, permits access to the requested transaction or service.

None of the prior art discloses or suggests (1) enabling a mobile device to serve as an alternative to a bank card in wireless short-range transactions without using currency; (2) providing a pilot linked to a mobile device or phone and a terminal by first and second short range radio links, respectively; (3) providing a third short range radio link between the terminal and the phone; (4) initiating a secure connection between the terminal and phone, via the pilot device and the third short range radio link; (5) providing a user transaction interface at a merchant terminal enabling a user to conduct secure transactions via the terminal; (6) establishing a secure connection between the mobile device and the terminal for conducting wireless secure transactions, such as e-commerce, and (7) establishing a secure connection for the mobile device with a terminal using short-range communication (Bluetooth) without using a service discovery protocol.

INVENTION SUMMARY

A short-range communication method, system and program product enable a user in a mobile environment to conduct short-range transactions with a self-service merchant terminal in a user friendly environment, particularly with respect to transaction security and payment mechanism without using currency. In one embodiment, the transaction is conducted via a short-range secure connection, typically Bluetooth, between the terminal and a mobile phone device. In addition to the phone device, the user carries a portable magic wand or pilot as a fob, typically a smart card, associated with the mobile phone or device. The phone includes an application for: (1) generating and sending the pilot a random nonce and a sequence number (SEQ), and (2) imprinting a secret key (k) and the phone address, typically the MAC address in the pilot via a RFID connection, when the pilot is within the range of an RFID reader installed in the phone. Subsequently, to conduct a transaction with a self-service terminal, the user passes or waves or touches the terminal with the pilot. The terminal in response to the waving or touching by the pilot activates an RFID connection to the pilot. The terminal sends the pilot a random number or nonce. The pilot computes a result (RES) using the nonce value, the secret key (k), the SEQ and a session key (K). The pilot returns the MAC address of the device and the (RES) to the terminal. The terminal using the MAC address and session key establishes a short-range secure connection, typically Bluetooth, with the device. The session key is derived by the device for completing the short-range communication with the terminal. In one embodiment, a user purchases an item or service from a clerk attending a self-service terminal at a counter. The clerk announces the price of the item or service and the user touches the terminal with the pilot. The clerk gives the user a paper receipt. The touching launches a legacy payment protocol, which the user can operate from the terminal. In another embodiment, the terminal downloads the user's transaction interface from the device, via the Bluetooth connection and displays the user interface at the self-service terminal. The user completes a transaction at the terminal via the user interface. The terminal sends the payment information, RES and random number to the device. The terminal accepts payment information from the device using a standard payment protocol. In another embodiment, a first pilot device serves as a "master" fob in activating at least one second pilot or :slave" fob for interacting with a terminal for goods and services in the manner previously described. To further enhance transaction security, the smart card stores a plurality of one-time authentication codes to initiate secure connections between the smart card and the device. Whenever the user initiates a connection request, the card selects a new authentication code. The device also stores a list of authentication codes. Whenever a new secure connection is initiated with the terminal, the device selects a subsequent code in the list to allow a subsequent secure connection. The security of a transaction can be still further enhanced by the device requiring a PIN from the terminal before transmitting the user interface. In addition to local authorization for e-commerce transactions, the pilot can serve to open electronic locks, authenticate persons in an airport, etc. by touching an RFID reader enabled terminal.

An aspect of the invention is a mobile device serving as an alternative to a bankcard in an e-commerce transaction.

Another aspect is a mobile device providing local payment service in place of money, checks or credit/debit cards, particularly payments of small value.

Another aspect is an e-commerce system downloading a user transaction interface from a mobile device for e-commerce transactions and payments by the user at the merchant terminal.

Another aspect is establishing a secure connection between a mobile device and a self-service terminal for conducting e-commerce transactions and payments.

Another aspect is establishing a secure connection between a mobile device and a terminal using short-range communication without using a service discovery protocol.

Another aspect is a smart card tag linked to a mobile device and a terminal via separate RFID interfaces for transferring security information from the mobile device to the terminal.

Another aspect is a terminal and mobile device communicating, via short-range transmission, and communicating with a smart card via, RFID transmissions.

Another aspect is a first pilot device serving as a "master" fob in activating at least one second pilot device or "slave" fob for interacting with a terminal for purchase of goods and services at a counter in a business establishment.

DESCRIPTION OF DRAWINGS

The invention will be further understood from the following detailed description of a preferred embodiment, taken in conjunction with an appended drawing, in which:

FIG. 2 is a representation of a mobile device included in FIG. 1 according to one embodiment of the present invention;

FIG. 2A is a representation of software stored in the mobile device of FIG. 2 according to one embodiment of the present invention;

DESCRIPTION OF PREFERRED EMBODIMENT

Figure 1:
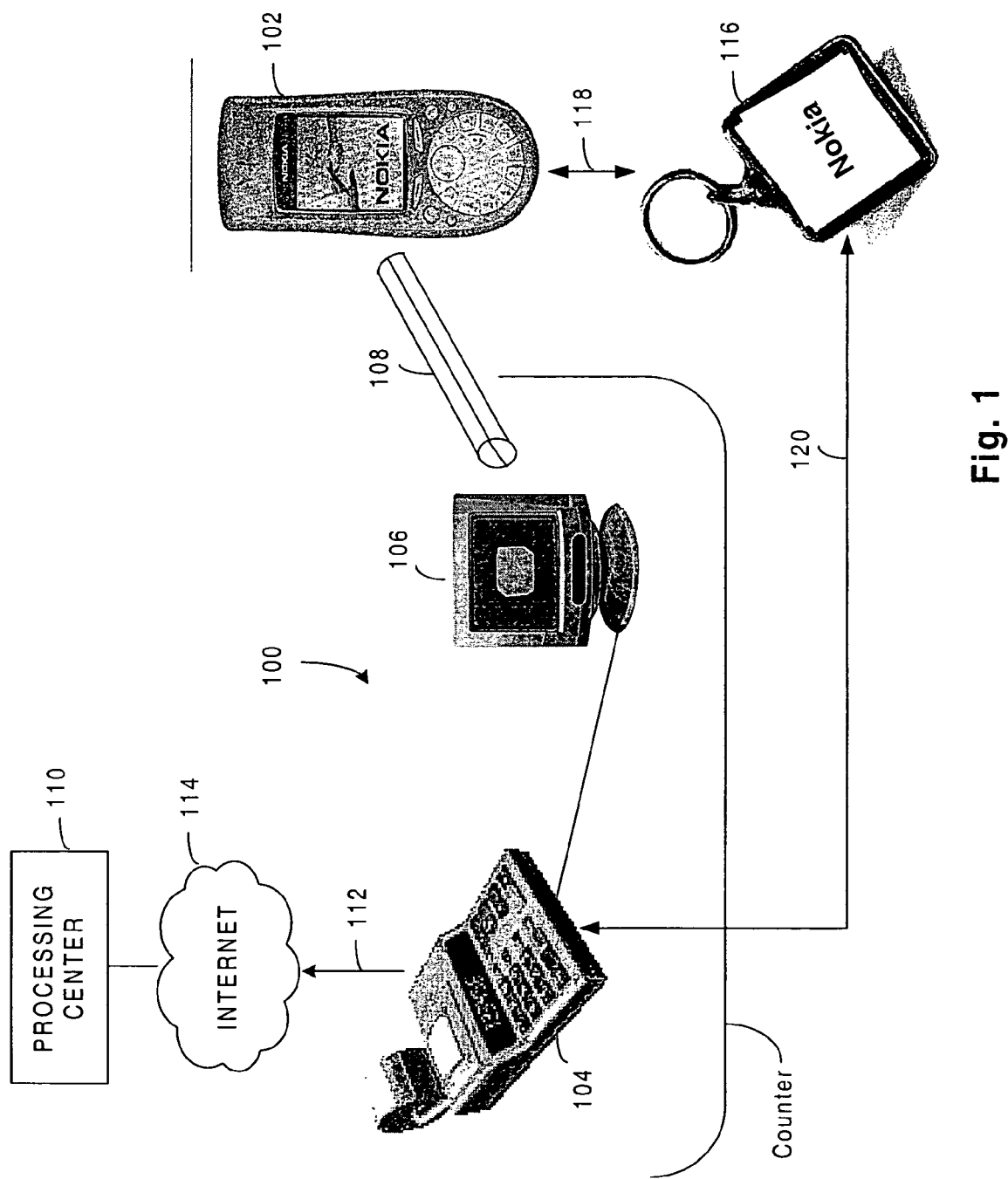
FIG. 1 is a representation of an E-Commerce system including a mobile device, pilot or smart card and a self-service terminal incorporating the principles of the present invention.

A brief description of short-range wireless systems, as follows, should aid in a better understanding of the invention:

A. SHORT-RANGE WIRELESS SYSTEMS

Short-range wireless systems have a typical range of one hundred meters or less. They often combine with systems wired to the Internet to provide communication over long distances. The category of short-range wireless systems includes wireless personal area networks (PANs) and wireless local area networks (LANs). They have the common feature of operating in unlicensed portions of the radio spectrum, usually either in the 2.4 GHz Industrial, Scientific, and Medical (ISM) band or the 5 GHz Unlicensed-National Information Infrastructure (U-NII) band. Wireless personal area networks use low cost, low power wireless devices that have a typical range of ten meters. The best-known example of wireless personal area network technology is the Bluetooth Standard, which operates in the 2.4 GHz ISM band. It provides a peak air link speed of one Mbps and a power consumption low enough for use in personal, portable electronics such as PDAs and mobile phones. Wireless local area networks generally operate at higher peak speeds of between 10 to 100 Mbps and have a longer range, which requires greater power consumption. Wireless local area networks are typically used as wireless links from portable laptop computers to a wired LAN, via an access point (AP). Examples of wireless local area network technology include the IEEE 802.11 Wireless LAN Standard and the HiperLAN Standard, which operates in the 5 GHz U-NII band.

B. BLUETOOTH SHORT-RANGE WIRELESS TECHNOLOGY

Bluetooth is a short-range radio network, originally intended as a cable replacement. It can be used to create networks of up to eight devices operating together. The Bluetooth Special Interest Group, Specification Of The Bluetooth System, Volumes 1 and 2, Core and Profiles: Version 1.1, 22 Feb. 2001, describes the principles of Bluetooth device operation and communication protocols. The devices operate in the 2.4 GHz radio band reserved for general use by Industrial, Scientific, and Medical (ISM) applications. Bluetooth devices are designed to find other Bluetooth devices within their ten-meter radio communications range and to discover what services they offer, using a service discovery protocol (SDP).

The SDP searching function relies on links being established between the requesting Bluetooth device, such as a stationary access point device, and the responding Bluetooth device, such as a mobile user's device. When the mobile user's device enters within communicating range of the access point, its Link Controller layer in its transport protocol group handles the exchange of inquiry and paging packets to establish the initial link with the access point device. This process is relatively fast, typically being completed in approximately from one to five seconds. Then, the Logical Link Control and Adaptation Protocol (L2CAP) layer in the transport protocol group passes the link status up to the RFCOMM/SDP layer. RFCOMM provides serial port emulation, which can be used to connect to legacy application and data transfer using several Bluetooth profiles. The Service Discover Protocol (SDP) searching function can then be used to find out about application programs in the responding Bluetooth device that may provide desired services. The SDP searching function can require several seconds to complete, depending on the complexity of the search and the size of the device's registry.

An example application program service that can be discovered by the SDP searching function is the Wireless Application Environment (WAE) graphical user interface (GUI) function of the Wireless Application Protocol (WAP). WAP-enabled wireless devices can use a microbrowser to display content on a small screen of the device. WAP uses a combination of Internet protocols with other protocols especially modified to work with mobile terminals. The Internet protocols are: Point to Point Protocol (PPP), Internet Protocol (IP), and User Datagram Protocol (UDP). The special mobile terminal protocols are: Wireless Transport Layer Security (WTLS), Wireless Transaction Protocol (WTP), Wireless Session Protocol (WSP), and Wireless Application Environment (WAE). It is the WAE that provides the microbrowser user interface for WAP. In order to establish a connection to send content from the requesting access point device to the WAE microbrowser of the responding user's device, each of the WAP protocol layers WTLS, WTP, WSP, and WAE must be established, which can require several more seconds to complete and possibly significant user interaction on the way. Alternatively, a phone screen may be shown on a terminal display of a desktop PC using "Remote S60 Professional Software 2.0" enabling the phone to be operated from the terminal. "Remote S60 Professional 2.0" software is available from Handango, 301 Northeast Loop 820, Suite 200, Hurst, Tex. 76053 USA.

Turning to FIG. 1, an e-commerce system 100 incorporating the principles of the present invention is disclosed utilizing a mobile device 102 for conducting secure transactions with a terminal 104, typically a self-service terminal including a display 106, and without using currency or a credit card, etc. The transaction is conducted over a secure connection 108 using a short-range wireless system, typically Bluetooth. It should be noted that the present invention is not limited to Bluetooth technology. So, according to various embodiments of the present invention also other short-range wireless systems, such as, for example various Wireless Local Area Networking (WLAN) and Ultra Wide-Band (UWB) technologies may be applied instead of Bluetooth. The self-service terminal 104 is connected to a central transaction processing center 110, via a connection 112, to a network 114, typically the Internet. The terminal 104 and the display 106 may typically be located at a counter in a business environment and used by a user in conducting electronic transactions, via the Internet 114 and transaction processing center 110.

The mobile device is associated with a portable pilot 116, typically a smart card carried by a user in a wallet or a purse. The pilot, when activated by the mobile device, as will be described hereinafter, initiates a secure short-range connection between the self-service terminal 104 and the mobile device 102. The pilot is linked to the mobile device 102, via an RFID radio link 118, and to the terminal 104, via an RFID radio link 120.

Before describing the details of the e-commerce system operation, a mobile device, pilot, terminal and user interface will be described in more details.

FIG. 2 discloses a mobile device 200 representative of the mobile device 102 according to one embodiment of the present invention, shown in FIG. 1. A short-range transceiver 202 is connected to a first antenna 204. The device 200 also includes a network or cellular transceiver 206 coupled to an antenna (not shown) merged with the antenna 204. The network transceiver is used for cellular or LAN communications. The transceivers 202 and 206 are connected to an I/O circuit 208 serving a keypad 210 and coupled to a CPU or processor 212. A central bus 214 connects the CPU to a ROM 216 storing operating programs; a RAM 218 used by the CPU in implementing the operating programs; a display 219 providing user interfaces and a RFID reader 220 including a high frequency interface linked to an antenna 222 for coupling the mobile device to the pilot when within the proximity of the mobile device. A description of an RFID reader can be found in the text, "RFID Handbook" by K. Finkenzeller, published by John Wiley & Sons (April 2001) at pages 99–217. A power supply 224 provides the necessary energy for the mobile device.

FIG. 2A discloses software 226 stored in the ROM for use in the operation of the mobile device according to one embodiment of the present invention. A standard operating system 228 manages the basic operation of the CPU and housekeeping functions. Short-range communication software 230, typically Bluetooth, includes protocols for establishing secure connections and data exchanges with the terminal. Network Software 232 implements similar protocols for communication with a wireless cellular network or LAN. RFID software 234 provides the reader 220 with read/write protocols for authentication and data transfer to the pilot. Application software 236 carries out useful tasks, such as e-commerce.

Figure 3:
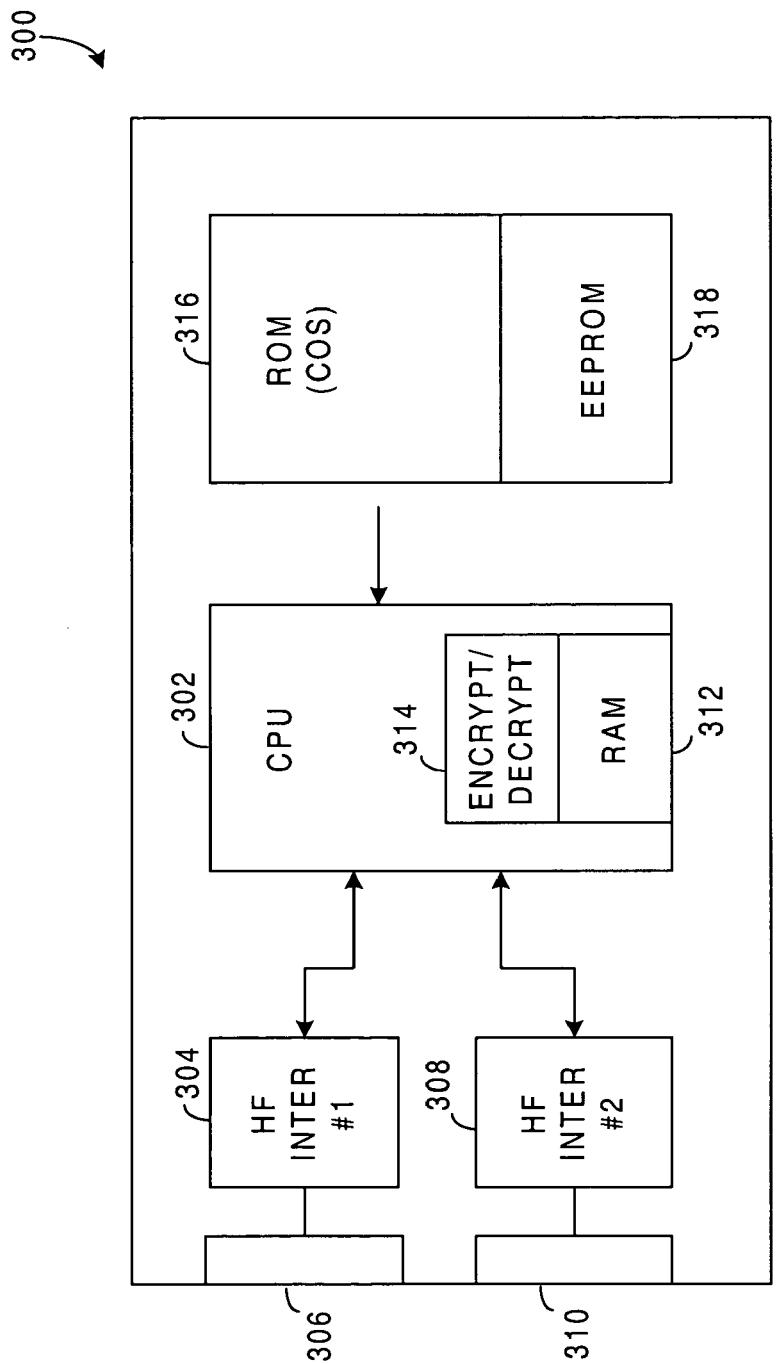
FIG. 3 is a representation of a pilot or smart card included in FIG. 1 according to one embodiment of the present invention.

FIG. 3 describes a pilot device or smart card 300 representative of the pilot device 216 in FIG. 1 according to one embodiment of the present invention. The pilot is portable and carried by the user in a wallet or purse, as the case may be. The pilot is removed from the wallet or purse and held closely to the mobile device, or, vice versa, to initiate a secure connection between the mobile device and a terminal for an e-commerce transaction, after the pilot and the terminal have been made ready for a secure connection, as will be described hereinafter. The pilot device includes a microprocessor 302 connected to a first high-frequency interface 304, coupled to an antenna 306 for interacting with the mobile device 102 (FIG. 1) via the Reader 220 (FIG. 2). The CPU is further connected to a second high-frequency interface 308 connected to an antenna 310 for interacting with the terminal 104 (FIG. 1) in establishing a connection between the terminal and the mobile device for e-commerce transactions. It should be noted that although two separate high-frequency interfaces (304, 310) are presented in FIG. 3, there might be only one high-frequency interface in the pilot. The CPU further incorporates a RAM 312, including encryption/decryption software 314 for security purposes with the mobile device and the terminal. Operating programs are stored in a ROM 316 connected to the CPU and an EEPROM 318 stores a MAC address and a security key of the mobile device for secure transmissions with the mobile device, as will be described in connection with FIG. 6. A power source (not shown) provides the necessary energy for the operation of the pilot. Additional details regarding the construction and operation of a smart card are described in the text, "RFID Handbook" by K. Finkenzeller, published by John Wiley & Sons (April 2001) at pages 99–217.

While the pilot has been shown for a semi-passive mode of operation, the pilot may also operate in a passive mode, where the energy required to activate the smart card is supplied by the Reader in the mobile device or terminal, as the case maybe.

Figure 4:
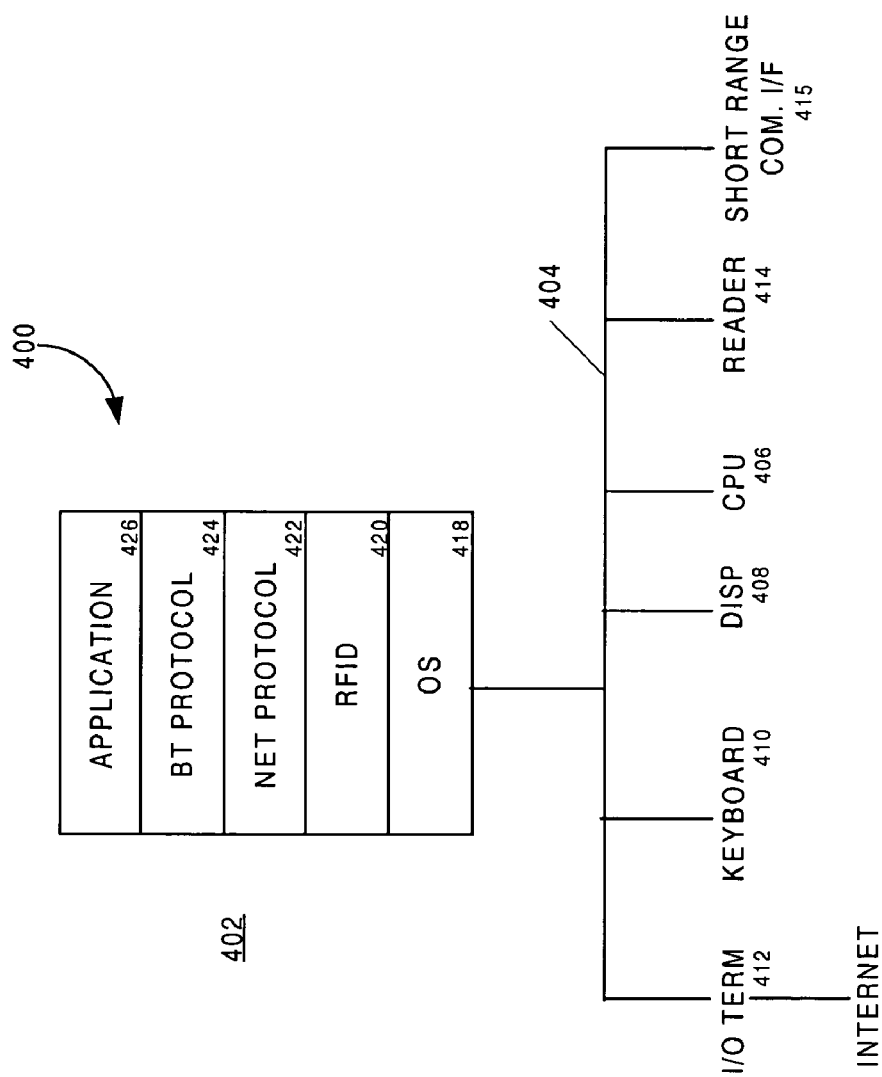
FIG. 4 is a representation of a merchant terminal in FIG. 1 according to one embodiment of the present invention.

FIG. 4 describes a terminal 400 representative of the self-service terminal 104 and display 114, shown in FIG. 1 according to one embodiment of the present invention. The terminal includes a memory 402, linked to a bus 404, serving a CPU 406, a display 408, a keyboard 410 an I/O terminal 412, a RFID reader 414, and a short range communication interface (Bluetooth) 415. All of the elements are standard. The memory 402 stores software enabling the terminal to interact with the mobile device and the pilot. An operating system 418 manages the tasks of the terminal. RFID) software 420 enables the terminal to interact with the pilot through an initial short-range link for initiating a secure short-range connection with the mobile device. Network software 422 provides protocols for the terminal to interact with the network in communicating with the central transaction processing center 110 via the Internet 114. (see FIG. 1). Bluetooth protocol software 424 enables the terminal to interact with the mobile device in establishing a secure connection and transferring information between the devices. Application software 424 enables the terminal to provide standard protocol for processing transactions initiated by the mobile device.

Figure 5:
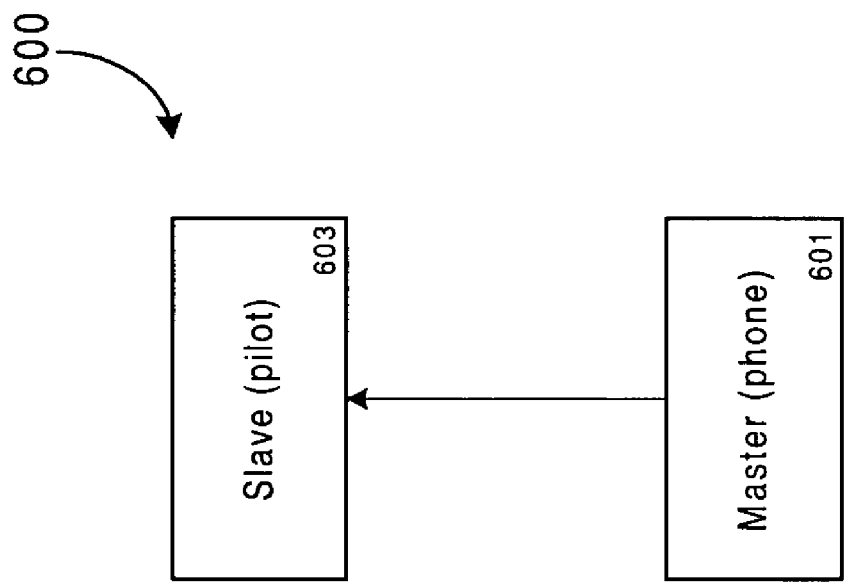
FIG. 5 is a representation of a master device imprinting a device address and secret key (k) in a pilot device according to one embodiment of the present invention.

FIG. 5 describes a generic process 600 for imprinting a secret key (k) and identification information, such as an address (typically a MAC address) of a phone or mobile device (as a Master) 601 into a pilot (slave) 603 according to one embodiment of the present invention, provided (1) the phone includes an RFID reader and the pilot includes a semi-passive or passive RFID transponder, (2) the phone includes an application that initiates imprinting and (3) the application can generate a secret key or generate an associative key under key agreement protocol with the pilot. The imprinting takes place when the pilot is held within the coverage area of the RFID reader and an RFID connection is established. Alternatively, the imprinting can be done by an external device, e.g. at a shop. According to various embodiments of the present invention, interfaces other than RFID may also be used, e.g. a constricted Bluetooth could be used. The most important aspect is that the coverage is close to touching i.e. very short-range coverage, so the possibility of eavesdropping is minimized.

Figure 5A:
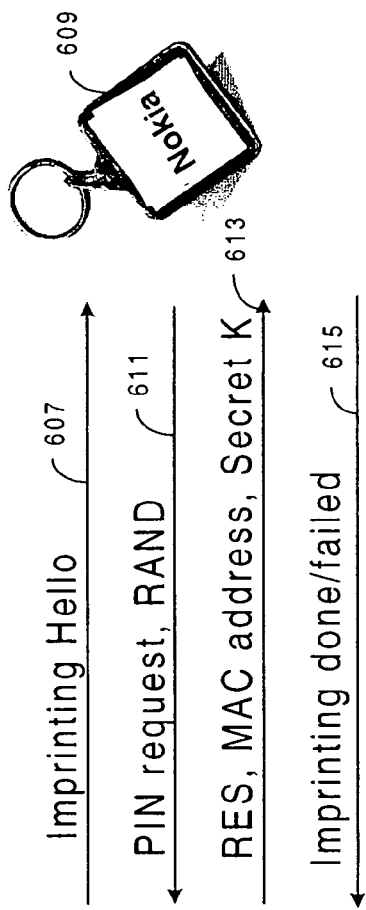
FIG. 5A is a representation of the imprinting of FIG. 5 in further detail according to one embodiment of the present invention.
Figure 5A:
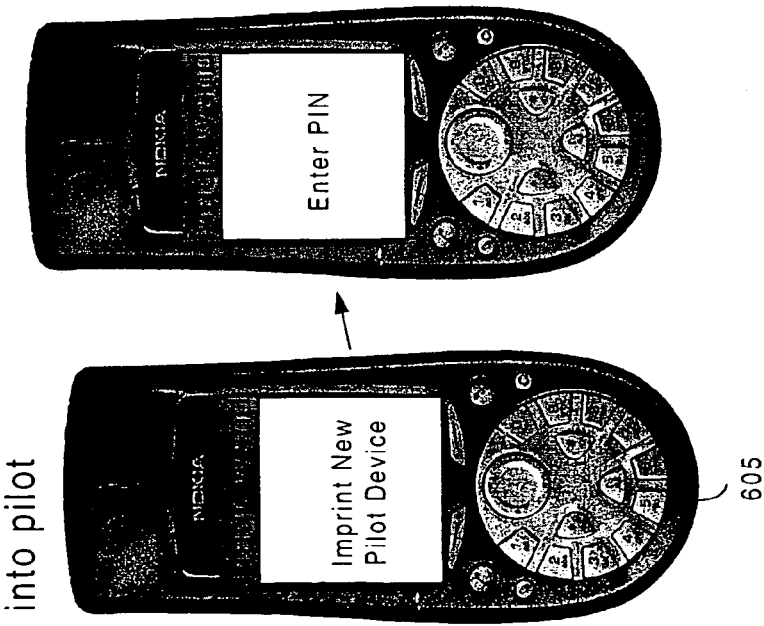

FIG. 5A provides further details on imprinting the phone address and secret key in the pilot according to one embodiment of the present invention. To establish a RFID connection, the mobile device 605 in Step 607 sends an activate or "hello" message in a form of an interrogation signal to the pilot or smart card 609. According to one embodiment of the present invention, the pilot sends a PIN request and random number message 611 to the mobile device as a response message to the interrogation signal. The PIN request is displayed to the user and the user enters a dedicated PIN for authenticating the imprinting of the pilot into the mobile device, and the mobile device computes a RESULT (RES) from the PIN and the challenged random number. The RES, MAC address and at least an association of the secret key (k) are returned by the mobile device to the pilot in a message 613 for imprinting in the pilot. The pilot checks whether the received RES corresponds with the dedicated PIN of the pilot, and stores the received device identification and the secret key information based on the results of the checking of the PIN done/failed message 615 which may be returned to the mobile device to complete the imprinting process. In this above-mentioned process, the user authenticates himself to the pilot with the PIN, and a resulting RES number with terminal identification information and at least an association of the secret key association is transmitted back to the pilot to complete the imprinting.

According to another embodiment of the present invention the pilot is imprinted without the need for user authentication with the PIN by only sending the MAC address and at least the association of the security key (k) to the pilot, which stores the received information to complete imprinting.

Figure 5B:
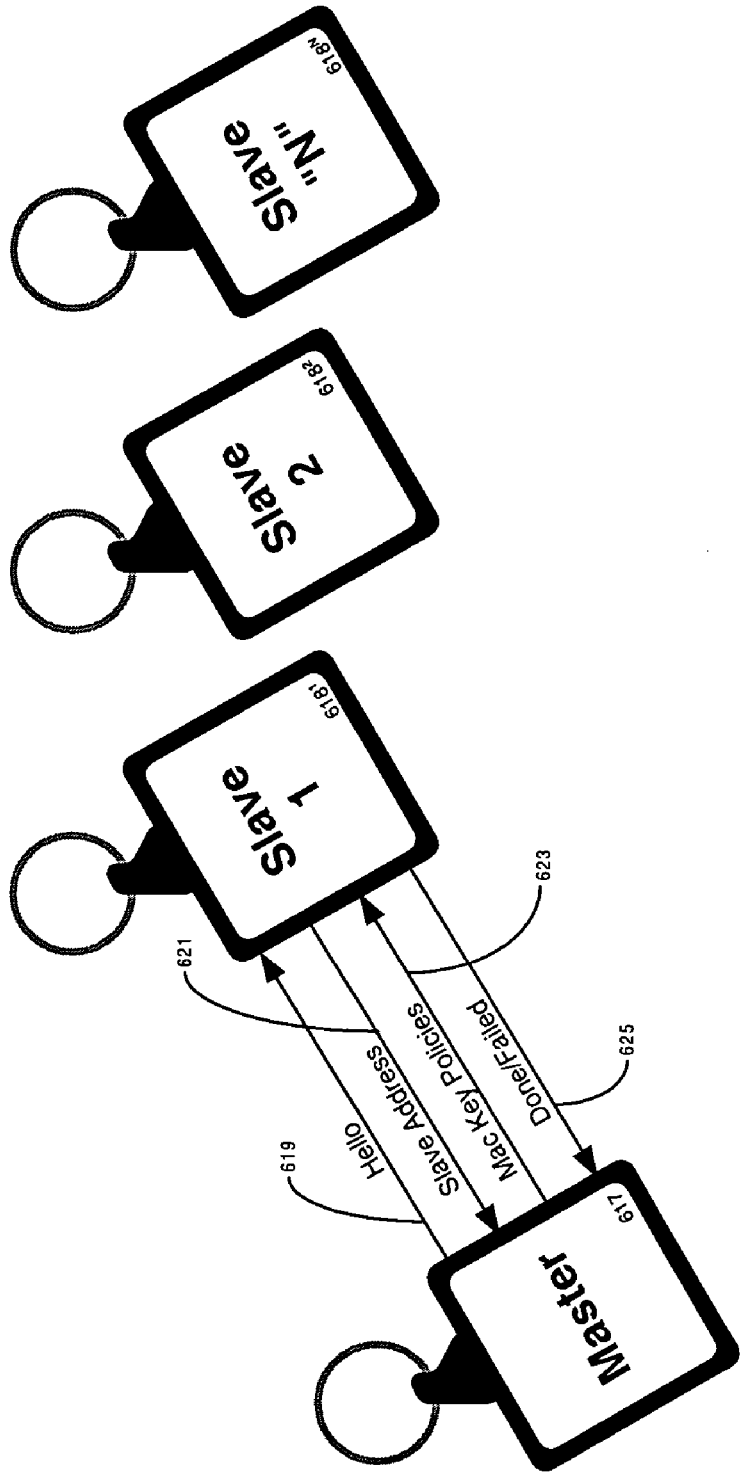
FIG. 5B is a representation of the imprinting of FIG. 5 in still another embodiment.

FIG. 5B describes another embodiment imprinting a secret key and address information into a pilot device by a user, wherein the pilot device serves as a "master fob" enabling the user to copy the "master fob" information into one or more of "slave fobs" for use by holders in interacting with self-service terminals. The slave fobs may be subject to predefined policy restraints limiting usage rights of the holder of the slave fob. As one example, the limited usage rights may limit the value of purchase items and/or the time period for interacting with a self-service terminal. As another example, the slave fobs may be subject to a list of prohibited shopping items at a self-service terminal. In another example, the slave fob verifies purchased items do not include any prohibited shopping items before authorizing payment of the purchased items.

FIG. 5B will be described in conjunction with FIGS. 3, 6 and 7. A "master fob" 617 is based on the pilot shown in FIG. 3, except modified to include a Reader coupled to the CPU 302 via an "ON/OFF" switch. (Both not shown). The switch is normally in the OFF state while the master fob interacts with the phone 118 and the terminal 118, as described in FIG. 1.

When the user desires to copy the imprinted address and secret key information in the master fob 617 into slave fobs 618[1], 618[2] and 618[N], one at a time, the Reader is activated by changing the switch to an ON state, generating a radio signal received by a slave fob (See FIG. 3), e.g. slave fob 618[1] held in close proximity to the master fob 617. Prior to interacting with the slave fob, the master fob stores in the ROM 316, the policy restraints applicable to the slave fobs. Thereafter, a Hello or interrogation message 619 is transmitted to the slave fob 6181, which uses the signal energy to return a response message 621 including an address identifying the slave fob. The master fob accesses the ROM 316 based on the slave fob address to determine policy restraints applicable to the slave fob 618[1], if any, and limiting the usage of the slave fob, as previously described above. The master fob returns a message 623 to the slave fob. The message includes the MAC address and security key of the phone associated with the master fob and any policy restraints. Optionally, the slave may return a done/failed message 625. The message 623 is imprinted in the EEPROM 318 of the slave fob for use in interacting with a self-service terminal, after establishing a secure connection between the terminal and the phone, as described in FIG. 6.

Figure 7:
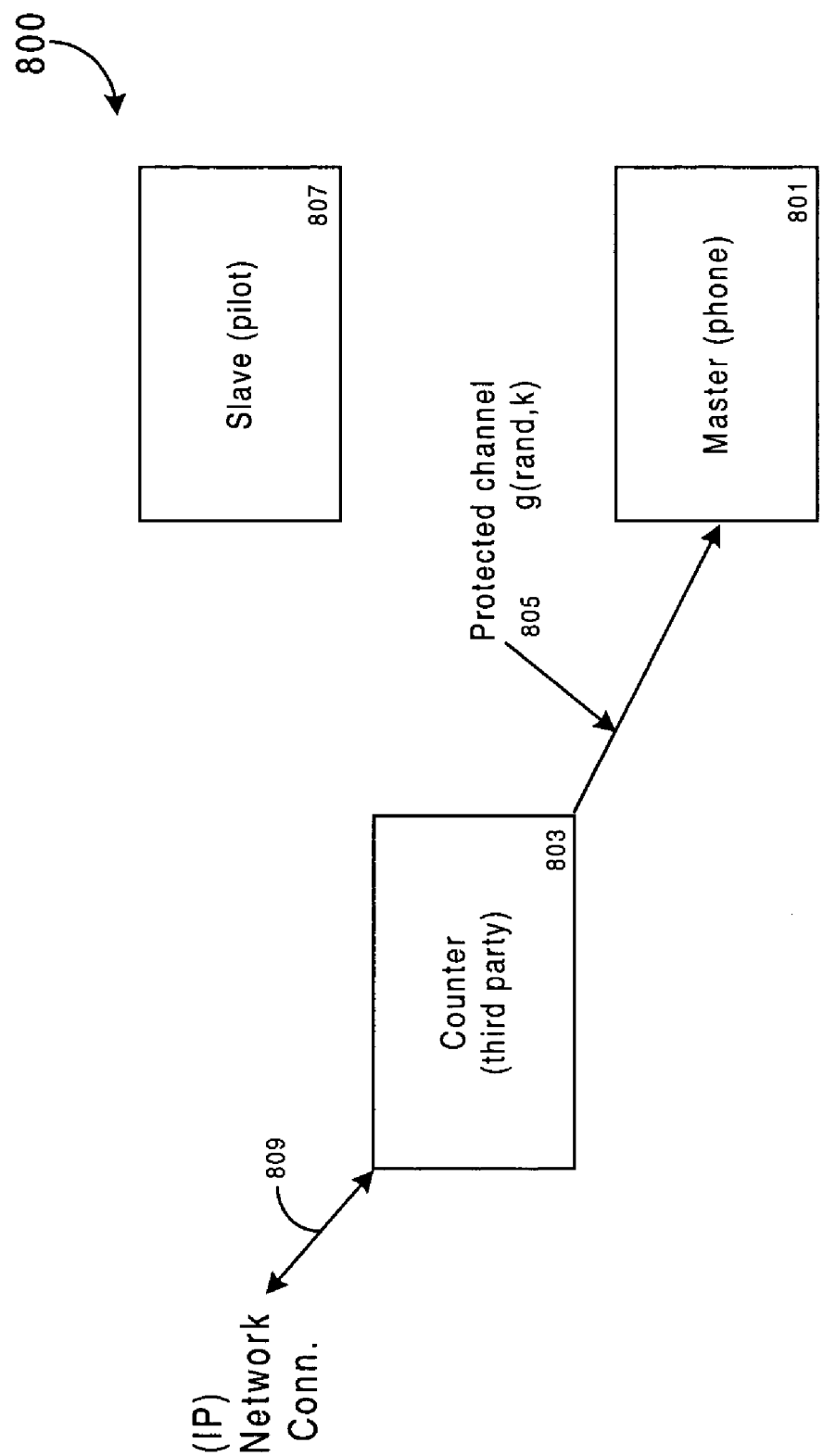
FIG. 7 is a representation of a process for purchase of an item at a terminal and processing payment information for the item in system of FIG. 1 embodying the present invention.

After the establishment of the secure connection, the holder of the slave fob interacts with the self-service terminal to make purchases according to a shopping list, A clerk at the counter delivers the purchased items, as described in FIG. 7. Upon completion of the shopping list, the holder using the terminal keyboard enters a request to the terminal to transmit a radio signal listing the purchased items. The radio signal is received by the slave fob and the list of item(s) compared to the prohibited list stored in the EEPROM 318. The CPU compares the purchased items against the prohibited items and using the energy of the terminal radio signal initiates a generated radio signal to the terminal authorizing or denying payment of the shopping list, as the case maybe. The message is displayed on the terminal screen and if the purchased items are approved, the holder of the slave fob touches the terminal screen to initiate payment. Otherwise, the transaction is canceled.

Another mode for fob-copying, which may be preferable, is to use the mobile terminal for copying sensitive information to the "slave" fobs similarly than to the "master" fob. The only difference is that the "slave" fobs may have more restrictions in accepting imprinting from the phone than from the "master" fob. The operation may be e.g., as follows:

Step 1:"Master fob" is introduced to the mobile phone, as described in FIG. 5A, and a "copy fob" is selected from the phone UI.

Step 2: The "master" fob transmits policy restraints to the phone.

Step 3: The user can select possible additional policy restraints to the "slave" fob.

Step 4: The phone transmits a hello message to one or more fobs.

Step 5: The phone receives addresses of the "slave" fobs and accesses a database linking restraints to the "slave" fobs according to the "slave" address.

Step 6: The phone transmits MAC address, security key and policy restraint to the "slave" fobs, one at a time or simultaneously, according to the "slave" address. The phone may see fit to assign different security keys to the "slave" fobs.

Step 7: The "slave" fobs interact with the terminal, as described in FIG. 5B.

In like manner, fob-copying may be performed by a "slave" fob-to-"slave" fob system requiring additional functionality from the fobs.

Figure 6:
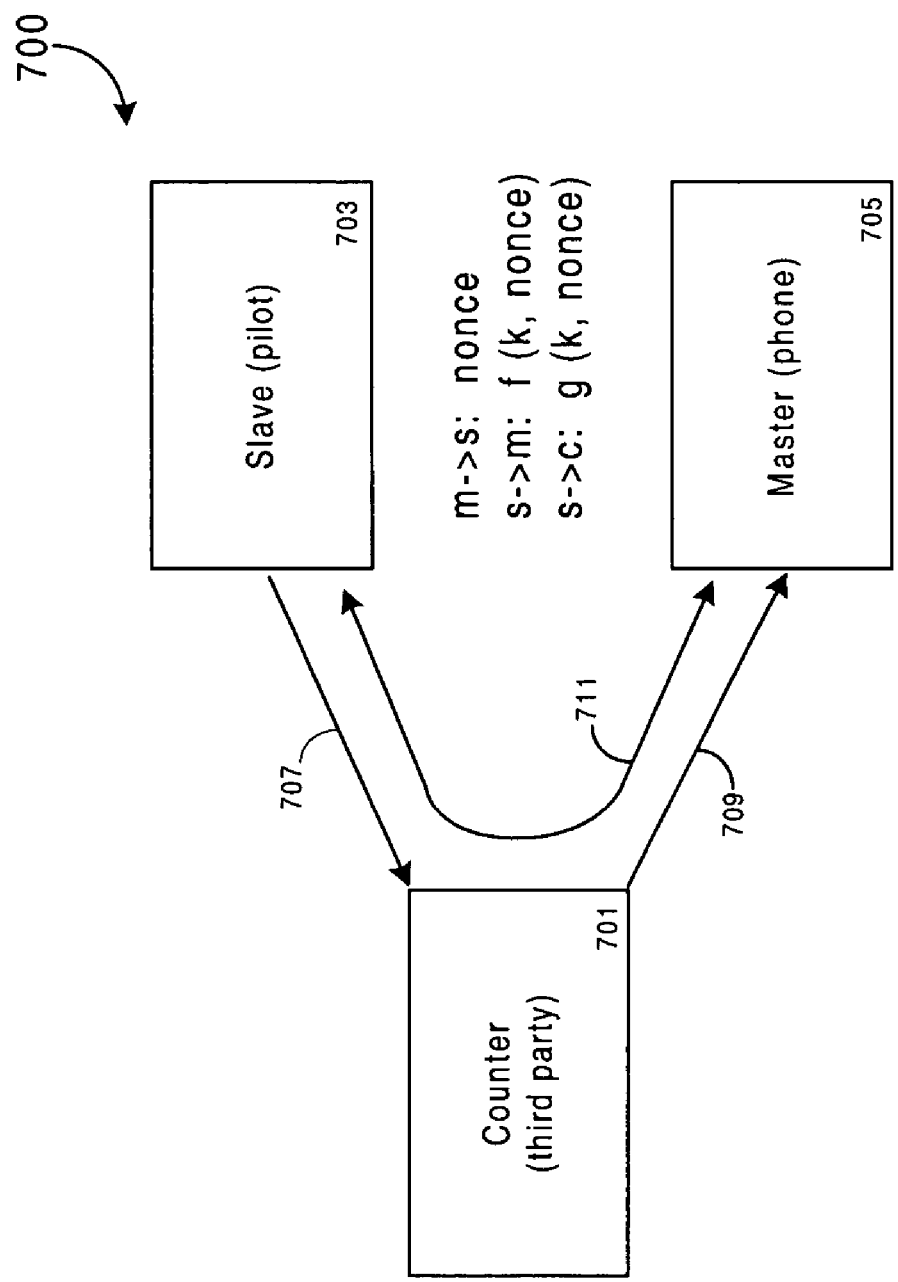
FIG. 6 is a representation of establishing a secure connection between a master phone and a third party terminal at a counter in the system of FIG. 1 according to one embodiment of the present invention.

FIG. 6 in conjunction with FIG. 1 describes a process 700 for establishing a secure short-range connection 108 between the phone 102 and a self-service terminal 106 according to one embodiment of the present invention, as follows:

Step 1: User touches third-party 701 self-service terminal with pilot 703. The pilot sends the device address of the mobile phone 705 to the third party 701 self-service terminal by means of an initial proximity RFID channel connection 707.

Step 2: By using this address, the self-service terminal connects to the phone using a short-range radio connection, such as, for example a Bluetooth connection 709 or the like.

Step 3: The phone 705 generates a random nonce and sequence number SEQ and sends them to the self-service terminal via connection 711, which uses according to one embodiment of the present invention the same connection as connection 709.

Step 4: The terminal sends the nonce and SEQ to the pilot via the connection 711, which uses according to one embodiment of the present invention the same connection as connection 707.

Step 5: The pilot computes RES=f (nonce, SEQ, k) (k is from imprinting) and K'=g (nonce, SEQ, k) and sends these to the terminal as a response message, (f) and (g) being one-way functions based on cryptographic hash computations.

Step 6: The terminal uses session key K' to establish a secure short-range communication channel with the phone. The counter part, which is the phone, derives the session key K' and uses that for the secure communication.

Step 7: The terminal verifies the presence of a correct pilot by computing the expected response XRES=f (nonce, SEQ, K) and verifies whether RES=XRES, and a secure communication channel is established between the terminal and the phone.

In the process 600, the user keeps the pilot within the self-service terminal during the whole of the establishment of the secure channel. According to another embodiment, only steps 1–2 are required to establish a secure short-range connection between the self-service terminal and the mobile phone, wherein the pilot 703 simply provides the self-service terminal 701 with phone address 705 (Bluetooth address of the mobile phone) and an association of the secret key of the phone that can be used by the terminal to establish a secure communication channel with the phone. In this embodiment, the level of security within the transaction is smaller, but the user is requested to simply wipe the pilot over the self-service terminal for establishing the secure channel, which is acceptable when considering small transactions. The essential thing in both embodiments during the establishment of the secure short-range connection between the self-service terminal and the mobile phone is that the necessary information for the connection establishment is provided through the portable pilot by an initial short-range link between the self-service terminal and the pilot, which has a significantly smaller radio coverage than the secure short-range connection to minimize the possibility of eavesdropping during the exchange of initiation information for the secure short-range connection establishment.

FIG. 7 describes a process 800 embodying the present invention enabling a user (not shown) using a mobile phone

801 to purchase an item or service from a self-service terminal 106 (See FIG. 1) at a counter 803, after a protected channel 805 is established between the terminal and the mobile device. A clerk attending the counter announces the price of the item or service to the user. The user touches the self-service terminal with a pilot 807 to initiate payment for the item or service. The clerk may give to the user a paper receipt. The touching of the pilot launches a legacy payment protocol to a network server via a network connection 809, typically the Internet, which the user can operate from the terminal depending on the implementation. The information about the payment is transmitted from the terminal to the phone 801, via the secure channel (based K') 805. The payment client automatically accepts the payment. The only user interaction in conducting the transaction is touching the self-service terminal with the pilot.

Figure 8:
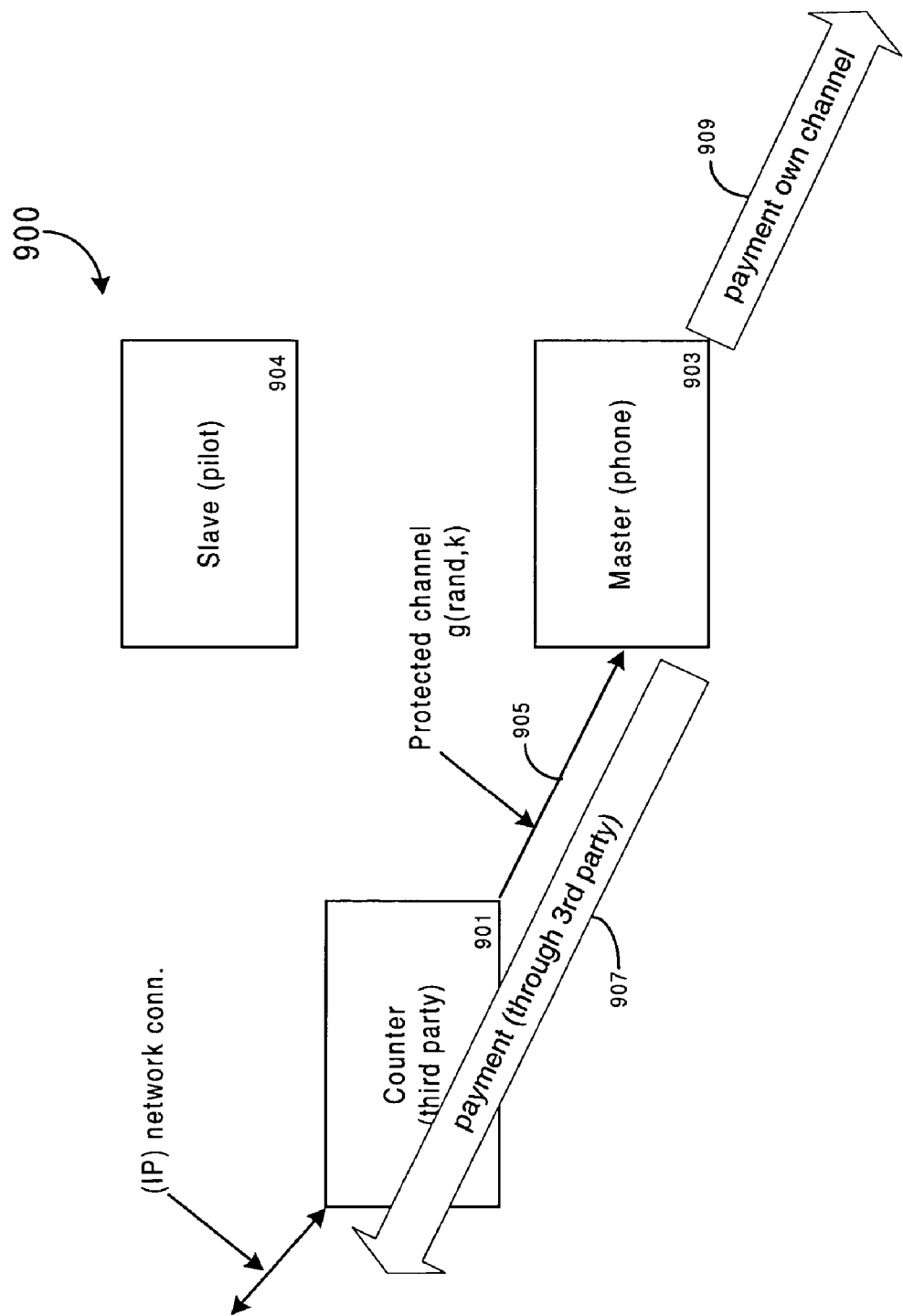
FIG. 8 is a representation of a process for the purchase of an item at a terminal using a user interface at a third party terminal in the system of FIG. 1 embodying the present invention.

FIG. 8 discloses a process 900 embodying the present invention, enabling a user to use any legacy payment protocol for purchase of an item or service at a third party merchant terminal 901. The third party terminal 901 requests a phone 903 to launch initiation payment application X, via a protected channel 905, provided the phone has successfully verified the presence of a correct pilot 904. The X application starts a remote terminal in the merchant terminal and launches a legacy payment client 907, via the third party terminal or over a phone communication channel 909.

There may be payment client software that needs user interaction through a user interface. In this case, with the secure channel established, as described in FIG. 6, and the merchant terminal equipped with suitable output/input methods (touch screen+keyboard), the output (screen image) of the phone is transferred to the merchant input/output methods. Such a programmatic facility is available for Windows (with Nokia Series 60 phones) over Bluetooth. The user may design his screen with suitable background/fonts, etc. to make certain that the screen displayed on the merchant terminal is really the same as on the phone (his own). The user then operates the payment mechanism on the phone with the remote user interface, and carries out the payment.

In this specific method, the payment value need not be transferred to the phone (as the interface is on the merchant terminal). Instead, the intended payment/account numbers, etc. may be put 'on a clipboard' in the merchant terminal, and pasted into the correct places in the user interface by the user.

Figure 9:
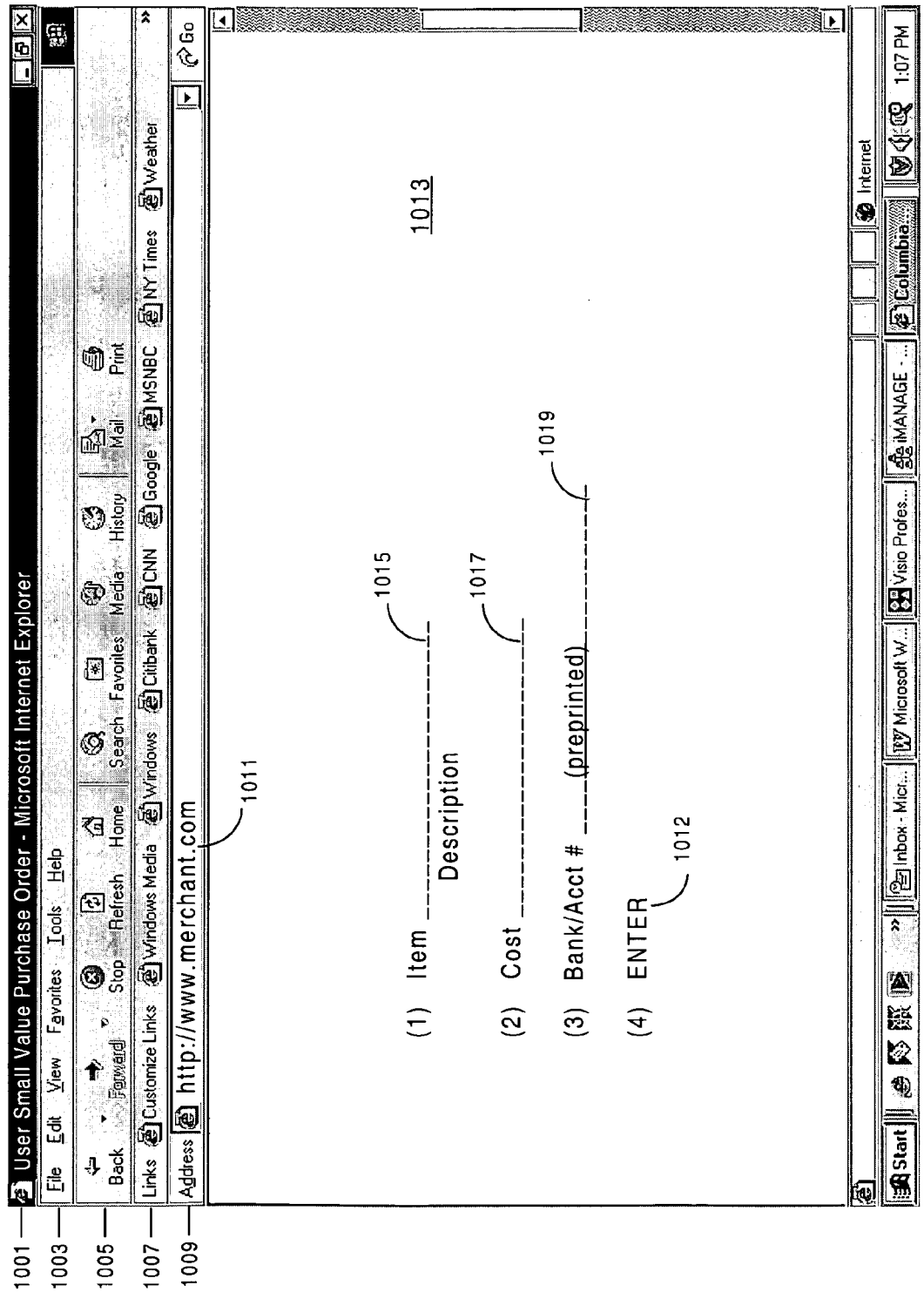
FIG. 9 is a representation of a user interface in the process of FIG. 8 according to one embodiment of the present invention.

FIG. 9 discloses one embodiment of a User Interface 1000 down loaded by the terminal from the mobile device 903 in the process 900, described in FIG. 8, after the protected channel 905 is established between the terminal 901 and the phone 903. The interface 1000 is shown in a Microsoft Internet Explorer format. However, the interface may be any other browser format, e.g. Netscape. The interface is used by the user in conducting a transaction at the terminal. In one embodiment, the screen may consist of a title bar 1001; standard operating system function bar 1003, various operating button bar 1005; a link connections bar 1009 to other servers; an address bar 1009 including a merchant Internet address 1011 address and a start bar 1009 with connections to various operating programs. Additional details describing the Microsoft Interface Explorer bars are described in the text "Programming Microsoft Internet Explorer 5" by Scott Roberts, published by Microsoft Press, One Microsoft Way, Redmond, Wash. 98052-6399, (1999), Chapter 1. The interface includes a screen area 1013, which includes standard entries for purchasing an item at the terminal 901. In one embodiment, the line entries may include (1) an item description 1015; (2) an item cost 1017, and (4) a pre-printed bank and account number 1019 of the user. The user completes the entries and hits an enter bar 1012 to transmit the purchase order to the merchant. A central transaction processing center checks past user transactions and, if satisfactory, approves the release of the item by an attending clerk at the counter where the terminal is located.

Figure 10:
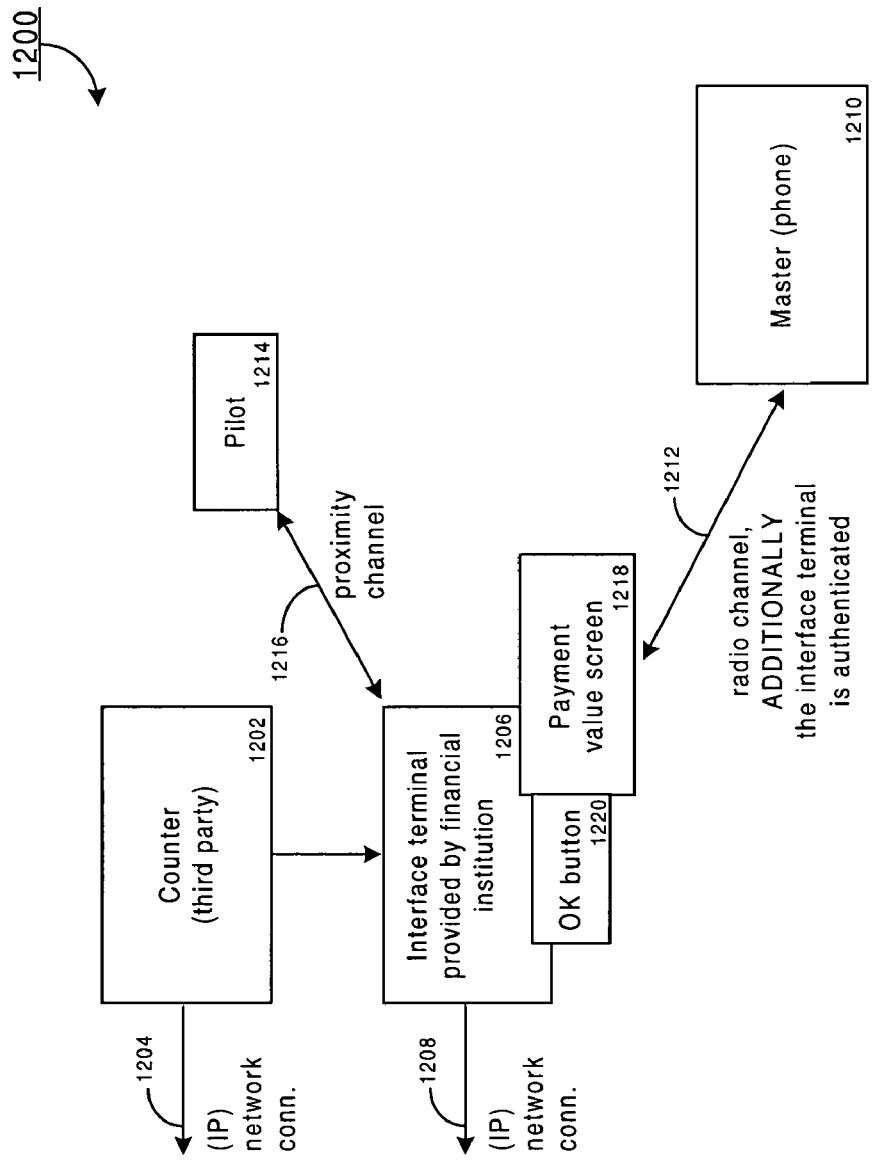
FIG. 10 is a representation of enhanced security for the purchase of an item in the processes of FIGS. 7 and 8 according to one embodiment of the present invention.

FIG. 10 describes a process 1200 for enhanced security for the payment processes described in FIGS. 7, and 8 according to one embodiment of the present invention. A merchant terminal 1202 can receive user payment information for transfer to a merchant server (not shown), via an Internet connection 1204, for processing or a clerk at the counter 1202 can direct the user payment information to a financial institution terminal 1206 for processing. The terminal 1206 can direct the payment information to a financial server (not shown), via an Internet connection 1208, for processing. Alternatively, the user can operate the terminal 1206, via a phone 1210, over a radio channel 1212 after authentication. A pilot 1214 can initiate the radio channel through a proximity channel connection 1216 to the terminal 1206. A payment value screen 1218 and OK button 1220 can be displayed to the user for operation.

Returning to FIG. 8, to enhance security even further in down loading a transaction UI, an additional authentication step is installed in the process 900. The authentication step requires an additional PIN code to be inserted by the merchant terminal in order to allow establishing the secure link for receiving the transaction interface. In other words, the following steps need to be included in the process 900:

(1) receiving (via an RFID interface) security information for initiating a secure communication link between the merchant terminal and the portable terminal.

(2) establishing a secure link between the merchant terminal and the portable terminal using the received information.

(3) providing additional security information to the portable terminal, e.g. merchant PIN code for accessing transaction UL.

(4) receiving transaction UI at the merchant terminal after verification of the PIN code by the portable terminal.

The transaction security could be further/alternatively enhanced by providing the pilot device with one-time authentication codes, so whenever one code is used, a subsequent code is required for establishing a new secure connection with the portable terminal. In one embodiment, a list of authentication codes is maintained in the memory of the smart card. Whenever a connection request is received, the RF smart card selects subsequent code. Similarly, the portable terminal has a corresponding list of codes. Whenever a new secure connection is established, the terminal selects a corresponding subsequent code in the list to be used for allowing a subsequent secure connection.

Summarizing, a secure wireless short-range transaction system and method have been disclosed which (1) enables a mobile device in conjunction with a pilot to serve as an alternative to a bank card in an e-commerce transactions, without involving currency; (2) provides a secure connection between a terminal, typically self-service and a mobile device using Bluetooth protocol without executing a service discovery protocol; and (3) downloads a user transaction interface from a mobile device to a terminal facilitating a user in conducting an e-commerce transaction. Also, the pilot maybe used in other environments. For example, touching an RFID reader enabled terminal with the pilot to (1) open an electronic lock, or (2) authenticate a person in an airport terminal.

While the invention has been described in terms of a preferred embodiment, various changes can be made without departing from the spirit and scope of the invention, as defined in the appended claims:

We claim:

1. A method enabling a user in a mobile environment to conduct transactions via a self-service merchant terminal, comprising:
   a) maintaining a security key in a mobile phone device;
   b) transferring the security key and mobile phone identification into at least one user portable fob or pilot via an initial short-range radio link;
   c) transferring the security key and the mobile phone identification from the at least one user portable fob or pilot to a self-service merchant terminal through the initial short-range radio link;
   d) establishing a secure short-range connection between the self-service terminal and the mobile phone based on the transferred security key and the mobile phone identification information from the at least on user portable fob or pilot, wherein the initial short-range radio link has a significantly smaller radio coverage than the secure short-range connection, and
   e) verifying the presence of a correct pilot by the terminal via computing and comparing an expected response from the mobile phone with the transferred security key.

2. The method of claim 1, wherein the secure short-range connection is used to conduct transactions without using currency.

3. The method of claim 1, wherein the initial short-range radio link complies with RFID technology.

4. The method of claim 1, wherein the secure short-range connection complies with Bluetooth technology.

5. The method of claim 1, wherein the coverage area of the short-range radio link is under 10 centimeters for the initial short-range radio link and a RFID connection between the mobile phone device and the pilot.

6. The method of claim 1, wherein the mobile phone identification is a Bluetooth address of the mobile phone.

7. The method of claim 1 further comprising:
   e) receiving a user transaction interface at the terminal upon establishment of the secure short-range connection.

8. The method of claim 1 further comprising:
   f) providing the at least one pilot a random number and a sequence number (SEQ) in response to a request for a secure connection between the terminal and the device.

9. The method of claim 1 further comprising:
   g) computing a RES=f (random number, SEQ, secret key (k)) and session key K' by the pilot and sending the RES and K' to the terminal.

10. The method of claim 1 further comprising:
    h) using the session key by the terminal to establish the secure connection with the device.

11. The method of claim 1 further comprising:
    i) deriving the session key by the device and using the derived session key for secure short-range communication with the terminal.

12. The method of claim 1 further comprising:
    j) verifying the presence of a correct pilot by the terminal via computing an expected response of XRES=f (random number, SEQ, K) and verifying whether RES=XRES.

13. The method of claim 1 further comprising:
    k) using symmetric keys for encryption/decryption of information transferred between the terminal and the device.

14. The method of claim 1 further comprising:
    l) using public key infrastructure for encryption/decryption of information transferred between the terminal and the device.

15. The method of claim 1 further comprising:
    m) storing a plurality of authentication codes in the at least one pilot for one time use in initiating secure connection requests.

16. The method of claim 1 further comprising:
    n) storing a plurality of authentication codes for one time use in the device for establishing short-range connections between the device and the terminal.

17. The method of claim 1 further comprising:
    o) transferring payment information from the terminal to the device via the secure channel based upon a session key K';
    p) automatically accepting the payment information by the device; and
    q) using a communication channel either provided by the terminal or the device to conduct a transaction.

18. The method of claim 1 further comprising:
    r) sending a request to the device by the terminal for the device to launch a payment application;
    s) launching the payment application after the device verifies the presence of a correct pilot;
    t) using the payment application at the terminal to launch a legacy payment client; and
    u) finalizing the transaction by a user at a user-interface displayed at the terminal.

19. A system for enabling a user in a mobile environment to conduct transactions via a self-service terminal, comprising:
    a) a mobile device including a short-range communication transceiver and an RFID transceiver;
    b) a semi-passive RFID transponder;
    c) a self-service terminal including a RFID transceiver and a short-range transceiver;
    d) means for storing identification information and at least security information in the mobile device;
    e) means for transferring said stored identification and the security information of the device over an RFID connection into the user portable fob or pilot;
    f) means for transferring by the user fob or pilot said transferred identification and security information to the self-service terminal over an RFID connection;
    g) means for establishing a secure short-range connection between the self-service terminal and the device based on said transferred identification and security information of the device from the user portable fob or pilot, wherein the RFID connection has significantly smaller radio coverage than the secure short-range connection, and
    h) means for verifying the presence of a correct pilot by the terminal via computing and comparing an expected response from the mobile phone with the transferred security key.

20. The system of claim 19, wherein the secure short-range connection is used to conduct transactions without using currency after establishment of the RFID connection.

21. The system of claim 19 wherein the self-service terminal receives a user transaction interface upon establishment of the secure connection.

22. The system of claim 19 further comprising:
h) means for storing a plurality of authentication codes for one time use in establishing a connection between the pilot and the device.

23. The system of claim 19 further comprising:
i) means for storing a plurality of authentication codes for one time use in establishing short-range connections between the device and the terminal.

24. The system of claim 19 wherein the pilot identifies the device for a short-range connection and initializes a security context.

25. The system of claim 19 wherein the user operates the user transaction interface at the terminal.

26. The system of claim 19 further comprising:
j) means activating the terminal for establishing a secure connection to the device.

27. A medium, executable in a computer system, enabling a user in a mobile environment to activate a self-service terminal to conduct transactions, the medium comprising:
a) program code for storing at least a security key in a mobile phone device;
b) program code for transferring the security key and mobile phone device identification in a user portable fob or pilot associated with the mobile phone device;
c) program code for transferring the security key and the mobile phone identification from the at least one user portable fob or pilot to a self-service merchant terminal through the initial short-range radio link;
d) program code for establishing a secure short-range connection between the self-service terminal and the mobile phone based on the transferred security key and the mobile phone identification information from the at least on user portable fob or pilot, wherein the initial short-range radio link has a significantly smaller radio coverage than the secure short-range connection, and
e) program code for verifying the presence of a correct pilot by the terminal via computing and comparing an expected response from the mobile phone with the transferred security key.

28. The medium of claim 27 further comprising:
e) program code in the terminal for downloading a user interface from the mobile phone device after establishment of a secure connection with the mobile phone device.

29. The medium of claim 27 further comprising:
f) program code for conducting product or service transactions between the terminal and the mobile phone device without using currency.

30. The medium of claim 27 wherein the terminal is within a merchant establishment or in a kiosk.

31. A method of enabling a first user portable fob or pilot device to serve as a master fob or pilot for at least one second user portable fob or pilot devices as slave devices capable of interacting with a terminal, comprising:
installing a reader and switching means in a first user portable fob or pilot device serving as a master device and further including a processor and storage means;
transferring and storing in the master fob or pilot device a phone address and a security key of a mobile phone;
at least one second user portable fob or pilot device, each serving as a slave device to the master device and further including a processor and storage, each slave device capable of
receiving and transmitting signals from/to the master device;
transferring the phone address, security key and policy restraints in a slave device after receiving an address identifying the slave device; and
using the slave device to interact with a terminal to purchase an item, after a secure connection is established between the terminal and the mobile phone.

32. The method of claim 31, wherein the imprinting step further comprises:
limiting the validity of the at least one portable pilot based on a predefined policy constraint.

33. The method of claim 31, wherein the predefined policy constraint includes at least one of a maximum purchase value and a maximum time limit in a slave device.

34. The method of claim 31 further comprising:
storing a list of prohibited purchase items in the slave device.

35. The method of claim 31 further comprising:
transmitting a list of purchased items from the terminal to the slave device.

36. The method of 31 further comprising:
comparing the purchased items to prohibited items stored in the slave device.

37. The method of claim 31 further comprising:
verifying in the slave device that no purchased item is a prohibited item.

38. The method of claim 31 wherein a policy restraints limits usage of the slave device to a maximum value for a purchased item.

39. The method of claim 31 wherein the policy restraints limits usage of the slave device to a maximum time period.

40. The method of claim 31 wherein the terminal receives a signal from the slave indicating approval or denial of a purchased item.

41. The method of claim 31 wherein the terminal displays approval or denial of the purchased items after receiving a signal from the slave device.

42. The method of claim 31 wherein the slave device touches or holds the slave device in close proximity to the terminal to authorize payment for the purchased after the terminal displays approval of the purchased by the slave device.

43. A method enabling a user in a mobile environment to conduct transactions via a self-service merchant terminal, comprising:
a) maintaining a security key in a mobile phone device;
b) transferring the security key and mobile phone identification into at least one user portable fob or pilot via a RFID connection between the mobile phone device and the at least associated portable pilot;
c) transferring the security key and the mobile phone identification from the at least one user portable fob or pilot to a self-service merchant terminal via a RFID connection between the mobile phone device and the at least associated portable pilot;
d) establishing a secure short-range connection between the self-service terminal and the mobile phone based on the transferred security key and the mobile phone identification information from the at least on user portable fob or pilot, wherein the RFID connection has a significantly smaller radio coverage than the secure short-range connection,
e) storing a plurality of authentication codes for one time use in the device for establishing short-range connections between the device and the terminal; and
f) receiving a user transaction interface at the terminal upon establishment of the secure short-range connection.

* * * * *